United States Patent [19]

Ueda

[11] Patent Number: 4,940,100
[45] Date of Patent: Jul. 10, 1990

[54] MOTOR VEHICLE

[75] Inventor: Yoshiteru Ueda, Kakogawa, Japan

[73] Assignee: Kawasaki Jukogyo Kabushiki Kaisha, Japan

[21] Appl. No.: 313,901

[22] Filed: Feb. 23, 1989

[30] Foreign Application Priority Data

Feb. 23, 1988 [JP] Japan .............................. 63-23685[U]

[51] Int. Cl.⁵ ............................................. B60K 11/08
[52] U.S. Cl. .................... 180/68.1; 180/68.2; 123/41.31; 123/41.57
[58] Field of Search ...................... 180/68.1, 68.2, 68.3, 180/68.4; 123/41.01, 41.31, 41.44, 41.57, 41.62

[56] References Cited

U.S. PATENT DOCUMENTS

| 4,577,720 | 3/1986 | Hamane et al. | 180/68.1 |
| 4,610,326 | 8/1986 | Kirchweger et al. | 180/68.1 |
| 4,706,615 | 11/1987 | Scadding | 123/41.01 |
| 4,771,844 | 9/1988 | Bassett | 180/68.1 |

FOREIGN PATENT DOCUMENTS 268817 11/1986 Japan .

Primary Examiner—Richard A. Bertsch
Attorney, Agent, or Firm—Leydig, Voit & Mayer

[57] ABSTRACT

A motor vehicle comprising an engine arranged in the rear part of an engine housing and a radiator arranged in a front part of the engine housing, in which the engine housing is closed at the front side thereof and an air inlet is provided at a rear part thereof so that cooling air for cooling the radiator passes across at least one side of the engine and flows toward a front side of the radiator, and an air guiding duct is connected to the rear side of the radiator so that the air passed through the radiator is discharged out of the engine housing without encountering the engine.

4 Claims, 1 Drawing Sheet

MOTOR VEHICLE

BACKGROUND OF THE INVENTION

The present invention relates to a motor vehicle, and more particularly to a cooling system for cooling an engine arranged in an engine compartment defined by an engine housing of a tractor and the like.

As described in the Japanese Patent Laid-open No. 61-268817 and the like, it is known to restrain the heating of the engine, thereby preventing the increase in temperature in the engine compartment, by discharging the air passed through the radiator out of the engine compartment without encountering the engine.

However, since none of the prior art techniques has given consideration to radiant heat of the engine, there was a problem that the radiant heat of the engine was trapped or stayed in the engine compartment.

SUMMARY OF THE INVENTION

An object of the invention is to effectively restrain the increase in temperature in the engine compartment, by providing an engine cooling system wherein the cooling air absorbs the radiant heat of the engine before it reaches the radiator and the air passed through the radiator is discharged out of the engine compartment without encountering the engine.

In order to achieve the above object, according to the present invention, the radiator is arranged at a front part in the engine compartment, the engine is arranged at a rear part in the engine compartment, a front end of the engine housing defining the engine compartment is closed and an air inlet is provided at a rear part of the engine housing so that cooling air for cooling the radiator passes across sides of the engine and then flows toward a front side of the radiator, and an air guiding duct being connected to a rear side of the radiator so that the air passed through the radiator is discharged out of the engine housing without encountering the engine.

DESCRIPTION OF THE PREFERRED EMBODIMENT

Figure 1:
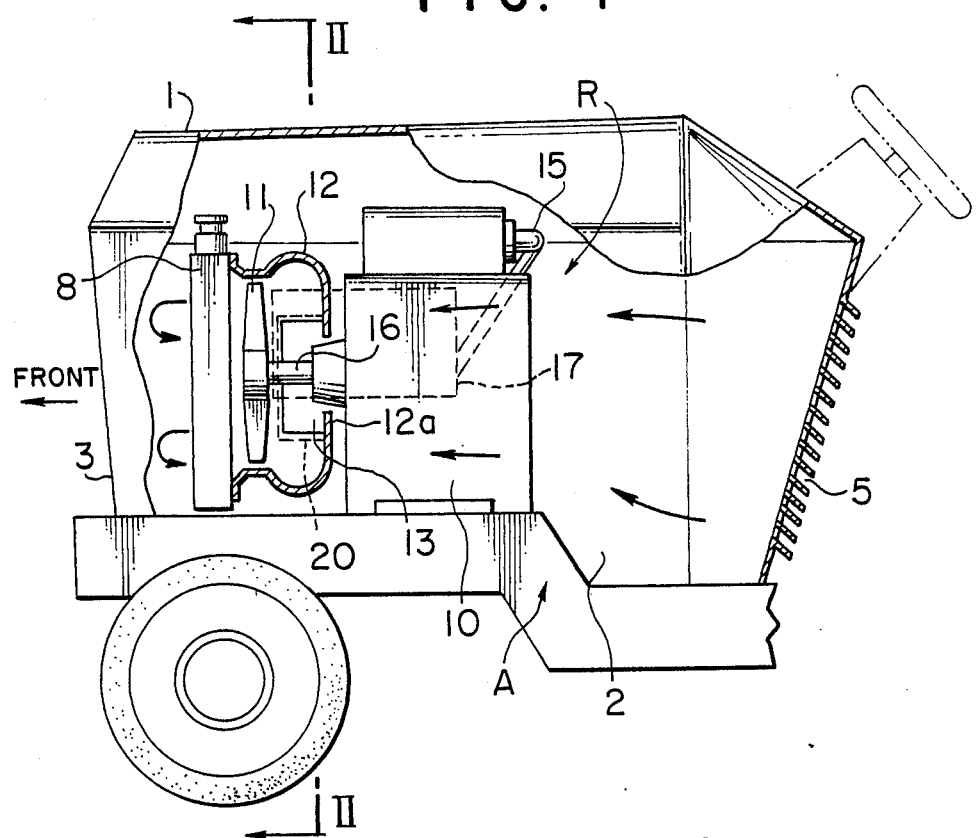
FIG. 1 is a longitudinal sectional view of an engine housing of a tractor to which the present invention is incorporated.

In an embodiment shown in FIG. 1, an engine housing has an upper engine hood 1, right and left side covers 2, a front cover 3 and the like for defining an engine compartment R, so that the engine compartment R is closed by the upper engine hood 1, the right and left side covers 2, the front cover 3 which closes a front part of the engine housing, and the like. An inlet 5 for introducing the cooling air is formed on a rear end portion of the engine compartment R.

A radiator 8 is arranged at a front part of the engine compartment R, and an engine 10 is arranged at a rear part of the engine compartment R. A cooling fan 11 is arranged between the rear surface of the radiator 8 and the front surface of the engine 10. The cooling fan 11 is fixed to a rotatable shaft 16 of the engine 10. An air guiding duct 12 is connected to the rear surface of the radiator 8, by which the cooling fan 11 is covered. The air guiding duct 12 has rear wall portions 12a which face the front surface of the engine 10 to shield the same, and elongated rectangular exits 13 are provided extending transversely, so that the cooling air passed through the radiator can be exhausted out of the engine housing without encountering the engine 10. The reference numeral 15 shows an exhaust pipe, and 17 shows an exhaust muffler.

Figure 2:
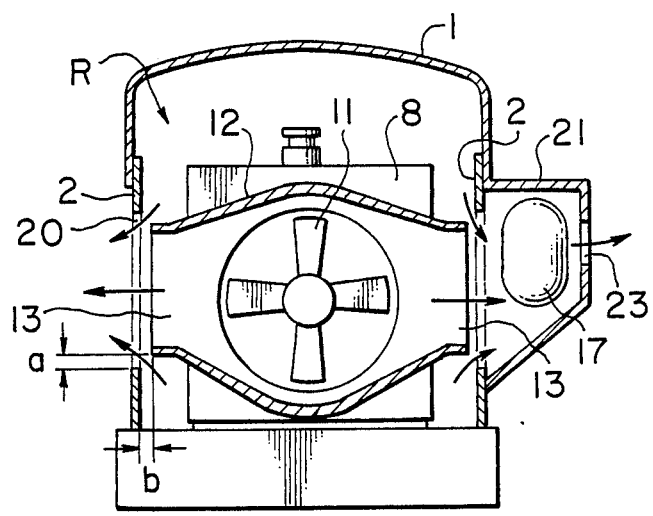
FIG. 2 is a sectional view taken along the line II—II of FIG. 1.

In FIG. 2, the air guiding duct 12 extends transversely and has right and left exits 13 on its both ends, these exits being aligned with corresponding openings 20 of the side covers 2.

A vertical clearance a and a horizontal clearance b are formed between the outer periphery of the exit 13 and the inner periphery of the opening 20. On one of the side covers 2 a muffler cover 21 is positioned, and the exhaust muffler 17 is arranged in this muffler cover 21 in such a manner that the muffler 17 is exposed to the cooling air discharged from the exit 13. The reference numeral 23 shows an air exit portion of the muffler cover.

The operation will now be explained. When the cooling fan 11 is rotated by the rotation of the engine 10 of FIG. 1, fresh air is introduced into the engine compartment R through the rear inlet 5 thereof. The introduced air flows forwardly in the engine compartment R, where the air absorbs the radiant heat from the engine 10 while passing across the sides of the engine and then reaches the front surface of the radiator 8. Then, the air flows rearwardly through the radiator 8 to cool it, and thereafter, the air flows in the air guiding duct 12 without encountering the engine and is discharged out of the engine compartment R through the side exits 13 in FIG. 2.

When the air is discharged from the exits 13, the air trapped in the engine compartment R is sucked through the clearances a and b and is entrained by the discharged air from the exits. In other words, the heat in the engine housing can be positively discharged, availing of the dynamic energy of the discharged air from the exits 13.

Further, the air discharged through the muffler cover 21 can cool the exhaust muffler 17 positively, thereby preventing "after burning" and improving anti-corrosion and/or anti-discoloration properties of the exhaust muffler 17.

In place of the air inlet 5 positioned at the rear end portion of the engine housing in the embodiment of FIG. 1, the air inlet can be arranged in a lower portion of the engine housing, for example, in an area shown by an arrow A in FIG. 1.

The exit of the air guiding duct 12 can be opened only at one side of the duct.

As explained above, according to the present invention, the following technical effects can be obtained:

(1) Since the cooling air introduced from the air inlet can be used to absorb the radiant heat of the engine and to cool the radiator, and since the air passed through the radiator can be discharged out of the engine housing without encountering the engine by means of the air guiding duct, the engine and the radiator positioned in the engine housing can be cooled effectively, thereby restraining the increase in temperature in the engine housing effectively.

Thus, overheating, power-down and seizure of the engine can be prevented.

(2) Since the cooling air is introduced from the rear end of the engine housing thereinto, foreign matter, such as dust, accumulated in the radiator can be considerably reduced, in comparison with a construction wherein the cooling air is introduced from the front end of the engine housing, thereby preventing deterioration of the radiator efficiency due to accumulation of the foreign matter on the radiator. Thus, the maintenance such as inspection and cleaning of the radiator can be facilitated, and the danger of overheating of the engine derived from jamming and obstruction of the radiator and the like can also be reduced.

(3) Since the front end of the engine housing is closed, noise generated when the cooling air passes through the radiator can considerably be reduced, in comparison with the conventional construction wherein cooling air is introduced from the front end of the engine housing.

Further, as in the illustrated embodiment of the present invention, when clearances are provided between the exits 13 of the air guiding duct and the openings 20 of the side covers to positively suck the air trapped in the engine housing, the temperature in the engine housing can be effectively lowered.

Further, when the exhaust muffler 17 is arranged near the exit 13 of the air guiding duct, the temperature of the exhaust muffler can be effectively lowered.

What is claimed is:

1. A motor vehicle comprising an engine housing having a closed front end; a radiator arranged in a front part of said engine housing; an engine arranged in a rear part of said engine housing; an air inlet provided at a rear part of the engine housing so that cooling air for cooling said radiator passes across in contact with at least one side of the engine and then flows toward a front side of said radiator; and an air guiding duct connected to a rear side of said radiator so that the air passed through the radiator is discharged out of the engine housing without encountering the engine.

2. A motor vehicle according to claim 1, in which a clearance is provided between an outer periphery of an exit of said air guiding duct and an opening formed in a side cover of said engine housing.

3. A motor vehicle according to claim 2, comprising an exhaust muffler arranged in proximity to the exit of said air guiding duct.

4. A motor vehicle according to claim 1, comprising an exhaust muffler arranged in proximity of the exit of said air guiding duct.

* * * * *